United States Patent
Rajagopalan et al.

(10) Patent No.: US 12,430,412 B2
(45) Date of Patent: *Sep. 30, 2025

(54) EMBEDDED PROCESSING SYSTEM WITH MULTI-STAGE AUTHENTICATION

(71) Applicant: RTX Corporation, Farmington, CT (US)

(72) Inventors: Jayashree Rajagopalan, Glastonbury, CT (US); Paul A. Adamski, Westfield, MA (US); Jason E. Posniak, Broad Brook, CT (US); Douglas E. Sansom, Suffield, CT (US)

(73) Assignee: RTX CORPORATION, Farmington, CT (US)

( * ) Notice: Subject to any disclaimer, the term of this patent is extended or adjusted under 35 U.S.C. 154(b) by 246 days.

This patent is subject to a terminal disclaimer.

(21) Appl. No.: 18/297,995

(22) Filed: Apr. 10, 2023

(65) Prior Publication Data
US 2023/0244765 A1 Aug. 3, 2023

Related U.S. Application Data

(63) Continuation of application No. 16/270,765, filed on Feb. 8, 2019, now Pat. No. 11,625,459.

(51) Int. Cl.
*G06F 21/31* (2013.01)
*G06F 3/048* (2013.01)

(52) U.S. Cl.
CPC .............. *G06F 21/31* (2013.01); *G06F 3/048* (2013.01)

(58) Field of Classification Search
CPC ........ G06F 21/31; G06F 3/048; G06F 21/575; G06F 21/57
See application file for complete search history.

(56) References Cited

U.S. PATENT DOCUMENTS

| | | | | | |
|---|---|---|---|---|---|
| 5,850,632 | A | * | 12/1998 | Robertson | G06F 12/0875 711/170 |
| 6,438,684 | B1 | * | 8/2002 | Mitchell | G06F 9/442 714/24 |

(Continued)

OTHER PUBLICATIONS

EP Application No. 20154170.3 Extended EP Search Report dated Jun. 9, 2020, 9 pages.

(Continued)

*Primary Examiner* — Aravind K Moorthy
(74) *Attorney, Agent, or Firm* — CANTOR COLBURN LLP

(57) ABSTRACT

An embedded processing system includes processing circuitry configured to execute a plurality of computer executable instructions. The embedded processing system also includes a memory system configured to store a plurality of configuration items, where at least one of the configuration items includes a sequence of the computer executable instructions. The embedded processing system also includes an authentication control configured to authenticate an immutable anchor associated with the embedded processing system, authenticate integrity of a reconfigurable entity map associated with the memory system, authenticate the configuration items based on the reconfigurable entity map, and perform an accommodation measure based on an authentication failure of at least one of the configuration items.

20 Claims, 4 Drawing Sheets

(56) References Cited

U.S. PATENT DOCUMENTS

| | | | |
|---|---|---|---|
| 6,850,396 B1* | 2/2005 | Clemo | H02H 3/087 361/100 |
| 7,210,137 B1* | 4/2007 | Tamma | G06F 40/205 717/148 |
| 7,620,658 B2* | 11/2009 | Benson | H04L 61/4552 707/999.102 |
| 7,853,799 B1* | 12/2010 | Trimberger | G06F 21/76 380/278 |
| 8,209,509 B2* | 6/2012 | Renno | G06F 12/1441 711/163 |
| 8,812,828 B2* | 8/2014 | Datta | G06F 21/00 713/2 |
| 9,292,206 B2 | 3/2016 | Frost et al. | |
| 9,961,060 B2 | 5/2018 | Nix | |
| 10,089,214 B1* | 10/2018 | Dixit | G06F 11/3055 |
| 10,502,785 B1* | 12/2019 | Camarota | G01R 31/318378 |
| 10,560,539 B1* | 2/2020 | Loch | G06F 16/95 |
| 10,565,382 B1* | 2/2020 | Diamant | H04L 9/0897 |
| 10,621,132 B1* | 4/2020 | Camarota | G06F 13/4022 |
| 10,848,320 B2 | 11/2020 | Yang | |
| 10,936,714 B1* | 3/2021 | McIntosh | G06F 21/53 |
| 11,153,074 B1* | 10/2021 | Nikitas | H04L 9/0897 |
| 11,625,459 B2* | 4/2023 | Rajagopalan | G06F 3/048 726/7 |
| 11,831,786 B1* | 11/2023 | Ratts | G06F 21/572 |
| 2003/0070030 A1* | 4/2003 | Smith | G06F 11/263 710/309 |
| 2003/0197993 A1* | 10/2003 | Mirowski | G06F 1/28 361/93.2 |
| 2003/0200448 A1* | 10/2003 | Foster | G06F 21/64 726/30 |
| 2003/0221114 A1* | 11/2003 | Hino | G06F 21/31 713/168 |
| 2004/0025086 A1* | 2/2004 | Gorday | G01R 31/317 714/37 |
| 2004/0172580 A1* | 9/2004 | Kabune | G06F 11/0757 714/E11.003 |
| 2004/0194079 A1* | 9/2004 | Nguyen | G06F 8/65 717/121 |
| 2005/0091494 A1* | 4/2005 | Hyser | G06F 21/52 713/171 |
| 2006/0136705 A1 | 6/2006 | Kaimal et al. | |
| 2006/0152249 A1* | 7/2006 | Madurawe | H03K 19/17764 326/80 |
| 2006/0190996 A1* | 8/2006 | Korkishko | G06F 21/57 726/9 |
| 2007/0073995 A1* | 3/2007 | Rudelic | G06F 12/1433 711/E12.1 |
| 2007/0150857 A1* | 6/2007 | Korkishko | G06F 21/645 717/136 |
| 2008/0126779 A1* | 5/2008 | Smith | G06F 21/575 713/2 |
| 2008/0184258 A1* | 7/2008 | Toyama | G06F 9/468 718/106 |
| 2009/0031409 A1* | 1/2009 | Murray | H04N 21/8166 726/10 |
| 2009/0276617 A1* | 11/2009 | Grell | G06F 21/575 713/2 |
| 2009/0327684 A1* | 12/2009 | Zimmer | G06F 21/575 713/2 |
| 2010/0027337 A1* | 2/2010 | Park | G11C 13/004 365/185.11 |
| 2010/0131812 A1* | 5/2010 | Mohammad | G11C 29/4401 714/723 |
| 2011/0060947 A1* | 3/2011 | Song | G06F 21/53 718/1 |
| 2011/0277441 A1* | 11/2011 | Ayshford | B01D 46/0086 55/480 |
| 2012/0297175 A1* | 11/2012 | Ekberg | G06F 21/575 713/1 |
| 2012/0311717 A1* | 12/2012 | McCarty | G06Q 10/08 726/26 |
| 2013/0013905 A1* | 1/2013 | Held | G06F 21/572 713/2 |
| 2013/0191622 A1* | 7/2013 | Sasaki | G06F 9/4401 713/2 |
| 2013/0191643 A1* | 7/2013 | Song | H04L 9/3265 713/176 |
| 2013/0238907 A1* | 9/2013 | Debout | H04L 9/0894 713/193 |
| 2014/0033305 A1 | 1/2014 | Nelson | |
| 2014/0189340 A1 | 7/2014 | Hadley | |
| 2014/0205092 A1* | 7/2014 | Hartley | H04L 9/0877 380/44 |
| 2014/0289537 A1 | 9/2014 | Parsons et al. | |
| 2014/0359239 A1* | 12/2014 | Hiremane | G06F 11/0766 711/163 |
| 2015/0007262 A1 | 1/2015 | Aissi et al. | |
| 2015/0026688 A1* | 1/2015 | Dice | G06F 9/4881 718/102 |
| 2015/0067832 A1* | 3/2015 | Sastry | G06F 21/564 726/22 |
| 2015/0113258 A1* | 4/2015 | Grieco | G06F 21/572 713/2 |
| 2015/0207624 A1* | 7/2015 | Laver | H04L 9/0894 713/189 |
| 2016/0098555 A1* | 4/2016 | Mersh | G06F 21/57 713/187 |
| 2016/0139828 A1* | 5/2016 | Yan | G06F 3/0679 711/103 |
| 2016/0171223 A1* | 6/2016 | Covey | G06F 9/4401 713/189 |
| 2016/0285628 A1* | 9/2016 | Carrer | H04L 9/321 |
| 2016/0291996 A1* | 10/2016 | Tsirkin | G06F 12/1009 |
| 2017/0171164 A1* | 6/2017 | Alexander | H04L 9/3268 |
| 2017/0185346 A1* | 6/2017 | Niell | G06F 12/0615 |
| 2017/0185771 A1* | 6/2017 | Sun | G06F 21/57 |
| 2017/0185782 A1 | 6/2017 | Furuya | |
| 2017/0236123 A1 | 8/2017 | Ali et al. | |
| 2017/0279219 A1 | 9/2017 | Yang | |
| 2017/0295182 A1* | 10/2017 | Teshler | H04L 51/212 |
| 2017/0307312 A1* | 10/2017 | Wall | G01S 17/04 |
| 2017/0353435 A1* | 12/2017 | Pritikin | H04W 4/02 |
| 2017/0364685 A1* | 12/2017 | Shah | G06F 21/575 |
| 2017/0364707 A1* | 12/2017 | Lal | G06F 21/6218 |
| 2017/0371559 A1* | 12/2017 | Higgins | G06F 3/0611 |
| 2018/0004953 A1* | 1/2018 | Smith, II | H04L 9/3268 |
| 2018/0022464 A1* | 1/2018 | Gelwan | F01D 13/00 701/100 |
| 2018/0080376 A1* | 3/2018 | Austin | F16M 3/00 |
| 2018/0096140 A1* | 4/2018 | Bulygin | G06F 21/52 |
| 2018/0096154 A1* | 4/2018 | Shivanna | G06F 21/572 |
| 2018/0113816 A1* | 4/2018 | Hellwig | G06F 21/53 |
| 2018/0137285 A1* | 5/2018 | Yamada | G06F 21/575 |
| 2018/0149090 A1* | 5/2018 | Maalouf | F02C 7/27 |
| 2018/0173822 A1* | 6/2018 | Zhu | G06F 30/367 |
| 2018/0189493 A1 | 7/2018 | Schilder et al. | |
| 2018/0216537 A1* | 8/2018 | Greenberg | F02C 9/18 |
| 2018/0234256 A1* | 8/2018 | Bowen | H04L 63/0823 |
| 2018/0293187 A1* | 10/2018 | Radhakrishnan | G06F 13/4068 |
| 2018/0293204 A1* | 10/2018 | Packer Ali | G06F 1/3293 |
| 2018/0322282 A1 | 11/2018 | Marcourt et al. | |
| 2018/0343122 A1* | 11/2018 | Spacek | H04L 9/3247 |
| 2018/0374556 A1* | 12/2018 | Varadarajan | G11C 29/38 |
| 2019/0012109 A1* | 1/2019 | Byun | G06F 3/0679 |
| 2019/0034318 A1* | 1/2019 | Mariasin | G06F 11/3698 |
| 2019/0042229 A1 | 2/2019 | Kotary et al. | |
| 2019/0052531 A1* | 2/2019 | Sividia | H04L 41/0873 |
| 2019/0065786 A1* | 2/2019 | Young | H04L 9/3247 |
| 2019/0080091 A1* | 3/2019 | Kim | H04L 63/123 |
| 2019/0097810 A1* | 3/2019 | Ghetie | G06Q 10/087 |
| 2019/0098016 A1* | 3/2019 | Jeon | H04L 63/0823 |
| 2019/0102539 A1* | 4/2019 | Durham | G06F 21/57 |
| 2019/0138730 A1* | 5/2019 | Liu | H04L 9/3247 |
| 2019/0180831 A1* | 6/2019 | Shukla | G11C 16/26 |
| 2019/0200160 A1* | 6/2019 | Shah | H04W 48/02 |
| 2019/0277676 A1* | 9/2019 | Koenig | F02C 7/18 |
| 2019/0286090 A1* | 9/2019 | Tabib | G06F 1/28 |
| 2019/0332392 A1* | 10/2019 | Pant | H04L 9/3213 |
| 2019/0338754 A1* | 11/2019 | Cai | F02C 9/00 |

(56) References Cited

U.S. PATENT DOCUMENTS

| | | | |
|---|---|---|---|
| 2019/0363894 A1* | 11/2019 | Kumar Ujjwal | H04L 9/3268 |
| 2020/0003072 A1* | 1/2020 | Zawilinski | F02C 7/277 |
| 2020/0050556 A1* | 2/2020 | Yeap | G06F 12/0292 |
| 2020/0095888 A1* | 3/2020 | Alstad | F28F 13/18 |
| 2020/0202004 A1* | 6/2020 | Montero | G06F 21/602 |
| 2020/0204374 A1 | 6/2020 | Skertic et al. | |
| 2020/0257777 A1 | 8/2020 | Rajagopalan et al. | |

OTHER PUBLICATIONS

EP Application No. 20154170.3 Office Action dated Oct. 18, 2021, 6 pages.

* cited by examiner

EMBEDDED PROCESSING SYSTEM WITH MULTI-STAGE AUTHENTICATION

CROSS-REFERENCE TO RELATED APPLICATIONS

This application is a continuation of U.S. application Ser. No. 16/270,765 filed Feb. 8, 2019, the disclosure of which is incorporated herein by reference in its entirety.

BACKGROUND

The subject matter disclosed herein generally relates to embedded processing systems and, more particularly, to a method and an apparatus for multi-stage authentication for an embedded processing system.

Embedded processing systems can include control system software that is critical to the physical performance of a control system. For example, a vehicle control system relies on a combination of carefully crafted control processes using a combination of instructions, constant data, and dynamically adjusted data to operate one or more electromechanical systems. If configuration items, such as software and/or data are modified, whether intentionally or unintentionally, the control system may be at risk of exhibiting undesirable behavior and/or degraded performance.

BRIEF DESCRIPTION

According to one embodiment, an embedded processing system includes processing circuitry configured to execute a plurality of computer executable instructions. The embedded processing system also includes a memory system configured to store a plurality of configuration items, where at least one of the configuration items includes a sequence of the computer executable instructions. The embedded processing system also includes an authentication control configured to authenticate an immutable anchor associated with the embedded processing system, authenticate integrity of a reconfigurable entity map associated with the memory system, authenticate the configuration items based on the reconfigurable entity map, and perform an accommodation measure based on an authentication failure of at least one of the configuration items.

In addition to one or more of the features described above or below, or as an alternative, further embodiments may include where the immutable anchor is hardware or software that establishes a root and chain of trust in authentication.

In addition to one or more of the features described above or below, or as an alternative, further embodiments may include where the reconfigurable entity map defines a list of address ranges for authenticating the configuration items in the memory system.

In addition to one or more of the features described above or below, or as an alternative, further embodiments may include where the list of address ranges includes two or more address ranges for one of the configuration items.

In addition to one or more of the features described above or below, or as an alternative, further embodiments may include where two or more different accommodation measures are defined for the list of address ranges.

In addition to one or more of the features described above or below, or as an alternative, further embodiments may include where the reconfigurable entity map identifies at least one of the address ranges to skip authentication.

In addition to one or more of the features described above or below, or as an alternative, further embodiments may include where the accommodation measure includes one or more of: resetting the embedded processing system, switching the embedded processing system to a fail-safe mode of operation, and transmitting an authentication failure message on a communication interface.

In addition to one or more of the features described above or below, or as an alternative, further embodiments may include where authentication includes one or more asymmetric cryptographic methods using unique key pairs that result in an authentication failure based on an incorrect key, a missing key, or software that is tampered with resulting in the authentication failure.

In addition to one or more of the features described above or below, or as an alternative, further embodiments may include where one or more of the configuration items are decrypted prior to authentication within the embedded processing system.

In addition to one or more of the features described above or below, or as an alternative, further embodiments may include where the embedded processing system is a controller of a gas turbine engine, and at least one of the configuration items includes an application configured to control operation of the gas turbine engine.

According to an embodiment, an authentication control of an embedded processing system authenticates an immutable anchor associated with the embedded processing system and can establish a root of trust. The authentication control authenticates integrity of a reconfigurable entity map associated with a memory system of the embedded processing system. The authentication control authenticates a plurality of configuration items in the memory system based on the reconfigurable entity map. An accommodation measure is performed based on an authentication failure of at least one of the configuration items.

A technical effect of the apparatus, systems and methods is achieved by multi-stage authentication for an embedded processing system as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
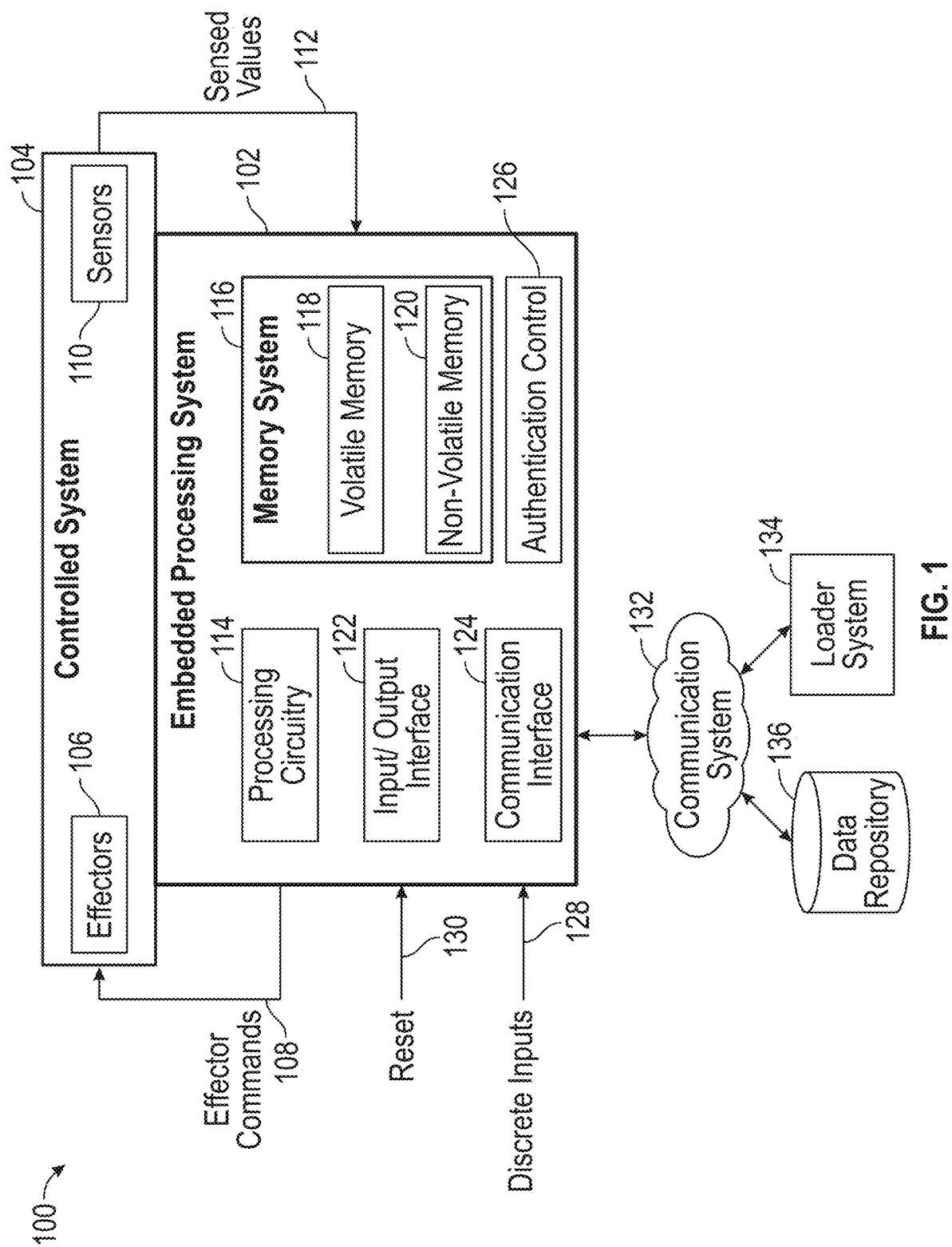
FIG. 1 is a block diagram of a system, in accordance with an embodiment of the disclosure.

Referring now to the drawings, FIG. 1 illustrates a system 100 that includes an embedded processing system 102 and a controlled system 104. The controlled system 104 can be any type of physical system that includes one or more effectors 106 controlled by one or more effector commands 108 generated by the embedded processing system 102. Examples of effectors 106 can include one or more motors, solenoids, valves, relays, pumps, heaters, and/or other such actuation control components. A plurality of sensors 110 can capture state data associated with the controlled system 104 and provide sensed values 112 as feedback to the embedded processing system 102 to enable closed-loop control of the controlled system 104 according to one or more control laws. Examples of the sensors 110 can include one or more temperature sensors, pressure sensors, strain gauges, level sensors, accelerometers, rate sensors, and the like. The controlled system 104 can be an engine, a vehicle, a heating, ventilating, and air conditioning (HVAC) system, an elevator system, industrial machinery, or the like. For purposes of explanation, embodiments are primarily described with respect to an engine system of an aircraft as the controlled system 104, such as a gas turbine engine, where the embedded processing system 102 may provide one or more control channels and/or monitoring systems of a controller (e.g., a full authority digital engine control) of one or more gas turbine engines.

In the example of FIG. 1, the embedded processing system 102 includes processing circuitry 114 and a memory system 116 configured to store a plurality of configuration items, where at least one of the configuration items includes a sequence of the computer executable instructions for execution by the processing circuitry 114. The executable instructions may be stored or organized in any manner and at any level of abstraction, such as in connection with controlling and/or monitoring operation of the controlled system 104. The processing circuitry 114 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 116 may include volatile memory 118, such as random access memory (RAM), and non-volatile memory 120, such as Flash memory, read only memory (ROM), and/or other electronic, optical, magnetic, or any other computer readable medium onto which is stored data and algorithms in a non-transitory form.

The embedded processing system 102 can also include one or more of an input/output interface 122, a communication interface 124, an authentication control 126, and/or other elements (not depicted). The input/output interface 122 can include support circuitry for interfacing with the effectors 106 and sensors 110, such as filters, amplifiers, digital-to-analog converters, analog-to-digital converters, and other such circuits to support digital and/or analog interfaces. Further, the input/output interface 122 can receive or output signals to/from other sources. As one example, discrete inputs 128 can be input to the input/output interface 122 to establish an operating mode of the embedded processing system 102 or to trigger actions by the embedded processing system 102. A reset signal 130 may also be received as a signal by the input/output interface 122 or may interface with other circuitry of the embedded processing system 102, such as power conditioning circuitry (not depicted). The communication interface 124 can be communicatively coupled to a communication system 132, which can include one or more direct or networked communication links to systems, such as a loader system 134, a data repository 136, or another system (not depicted). The loader system 134 can be any type of computer system operable to load new/updated configuration items to the embedded processing system 102 for storage in the memory system 116. The loader system 134 can interface to the communication system 132 through a wired, wireless, optical, or magnetic coupling. The data repository 136 can serve as a data source for updating the memory system 116, for instance, with control system data, or as a data sink to offload and clear data from the memory system 116, such as fault data, history data, and the like.

In embodiments, the authentication control 126 can be implemented in dedicated circuitry, such as an application specific integrated circuit, programmable logic device, field programmable gate array, or the like. Alternatively, the authentication control 126 can be implemented in software, such as boot software. In some embodiments, a processing core of the processing circuitry 114 can be dedicated for use by the authentication control 126. The authentication control 126 can be configured to implement embodiments as further described herein.

Figure 2:
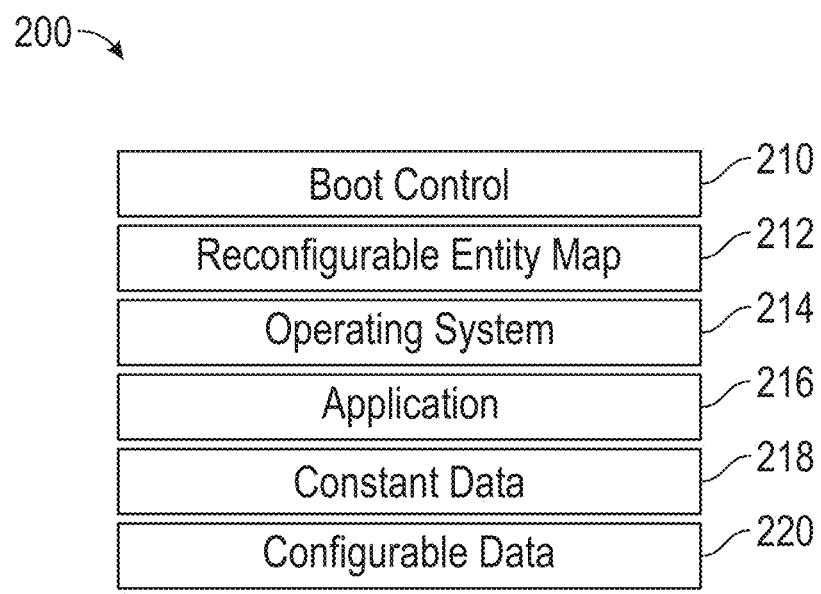
FIG. 2 is a block diagram of a plurality of configuration items for authentication, in accordance with an embodiment of the disclosure.

Referring now to FIG. 2, an example of a plurality of configuration items 200 for authentication is depicted. The configuration items 200 of FIG. 2 can include one or more of a boot control 210, a reconfigurable entity map 212, an operating system 214, an application 216, constant data 218, and/or configurable data 220. Further, there can be multiple instances of the configuration items 200, such as multiple instances of the application 216, constant data 218, configurable data 220, and/or other items. The configuration items 200 can have different levels of criticality and authentication required. The boot control 210 can manage the loading and/or initialization of other configuration items 200. The reconfigurable entity map 212 can define address ranges and authentication requirements of the configuration items 200. The operating system 214 can provide scheduling and support for one or more applications 216 to interface with various hardware elements of the embedded control system 102 of FIG. 1. One or more applications 216 that use constant data 218 and/or configurable data 220 can be invoked by the operating system 214. The application 216 can be, for example, configured to control operation of the controlled system 104 of FIG. 1.

Figure 3:
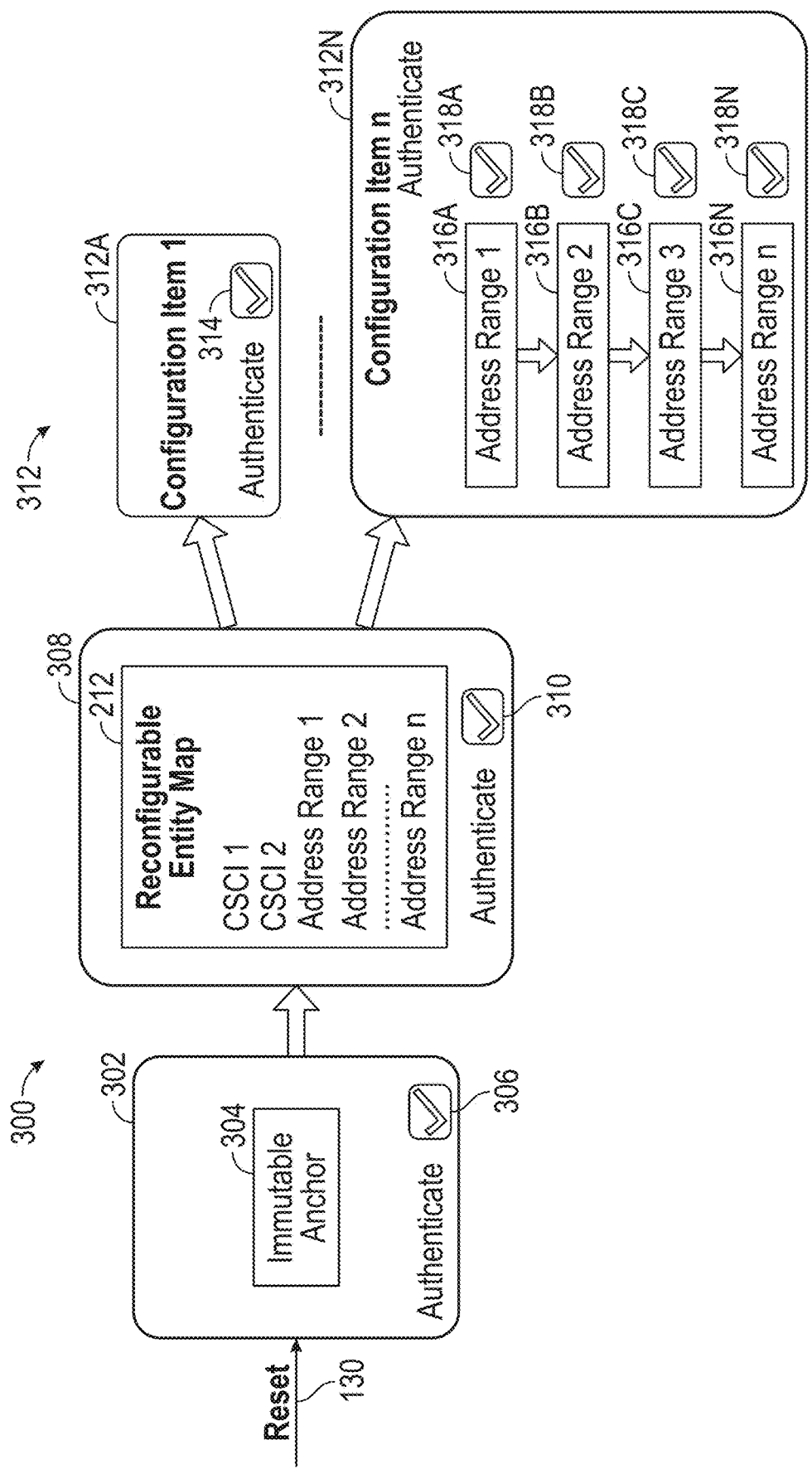
FIG. 3 is a block diagram of an authentication process, in accordance with an embodiment of the disclosure.

FIG. 3 depicts an example of an authentication process 300 that can be performed by the authentication control 126 of FIG. 1. Upon receiving a reset signal 130, a root authentication 302 authenticates an immutable anchor 304. The immutable anchor 304 is hardware or software that establishes a root and chain of trust in authentication. As one example, the immutable anchor 304 can be encoded in a read-only register that is accessible by the authentication control 126. Authentication of the immutable anchor 304 can include use of key pairs, certificates, signatures, and/or other known authentication techniques. Upon successful authentication 306 of the immutable anchor 304 during root authentication 302, the authentication control 126 can perform entity map authentication 308 of the reconfigurable entity map 212. Authentication can include one or more asymmetric cryptographic methods using unique key pairs that result in an authentication failure based on an incorrect key, a missing key, or software that is tampered with resulting in the authentication failure. For instance, if an incorrect key was used to sign the software, the corresponding key pair does not exist in the embedded processing system 102, or the software was tampered with, an authentication result may be a failure of a signature to authenticate. As a further example, an authentication failure can be detected for a memory range defined in the reconfigurable entity map 212 due to tampering of the memory content in the address range when the correct key exists.

Upon successful authentication 310 of the reconfigurable entity map 212 during entity map authentication 308, the contents of the reconfigurable entity map 212 can be used to locate a plurality of configuration items 312, which may be embodiments of the plurality of configuration items 200 of FIG. 2, including a first configuration item 312A up to configuration item 312N, where N represents any number of configuration items 312. In embodiments, the entity map authentication 308 defines a list of address ranges for authenticating the configuration items 312 in the memory system 116 of FIG. 1. Reconfigurable address ranges provide flexibility in authentication boundaries. Each of the configuration items 312 can be a sequence of executable instructions (e.g., executable by the processing circuitry 114) or data values, such as values that support execution of instructions (e.g., constant or trim values). Address ranges in the entity map authentication 308 may have a one-to-one correspondence with one or more of the configuration items 312, or the list of address ranges can include two or more address ranges for at least one of the configuration items 312. For example, an address range can identify a location and size of the first configuration item 312A in the memory system 116 as a single item for authentication 314. Further, multiple address ranges 316A, 316B, 316C, 316N can be associated with a single configuration item, such as configuration item 312N. Thus, rather than performing a single authentication for configuration item 312N, each of the address ranges 316A, 316B, 316C, 316N can have a corresponding authentication 318A, 318B, 318C, 318N.

The authentications 314, 318A-318N may also have different accommodation measures to handle authentication failure conditions. For example, different levels of criticality may be assigned to each of the configuration items 312 and/or address ranges 316A-316N. A high level of criticality may be assigned to instructions or control parameters for the controlled system 104, where degraded/faulty performance or non-performance of control operations could occur if non-authenticated instructions or control parameters are used. If the configuration items 312 are partitioned to include instruction sequences that are not critical to operation of the controlled system 104, such as diagnostic code, a lower level of criticality can be assigned that may not impede normal operation of controlling the controlled system 104. Further, the reconfigurable entity map can identify at least one of the address ranges 316A-31N to skip authentication, for instance, when a range of memory has to be authenticated during a software load, i.e., reprogramming of the embedded processing system 102, but not when the embedded processing system 102 powers up to control the controlled system 104.

Figure 4:
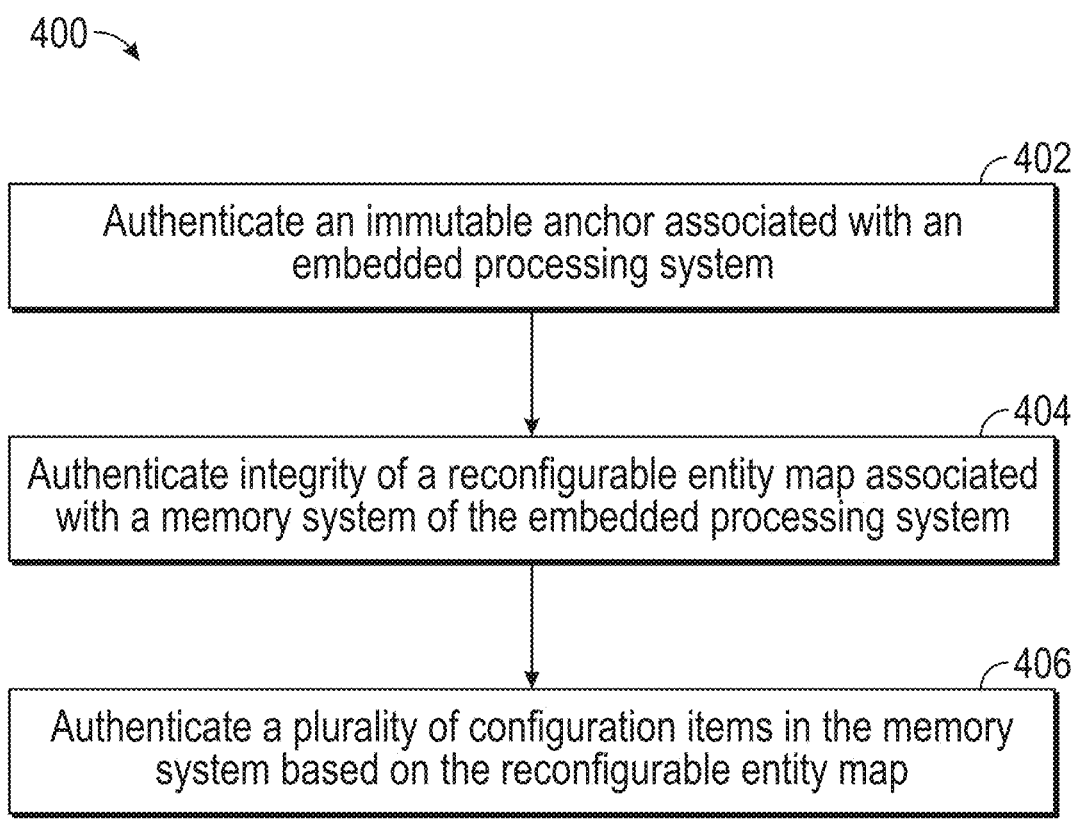
FIG. 4 is a flow chart illustrating a method, in accordance with an embodiment of the disclosure.

Referring now to FIG. 4 with continued reference to FIGS. 1-3, FIG. 4 is a flow chart illustrating a method 400 for multi-step authentication, in accordance with an embodiment. The method 400 may be performed, for example, by the authentication control 126 of FIG. 1.

At block 402, the authentication control 126 can authenticate an immutable anchor 304 associated with the embedded processing system 102 as part of root authentication 302. At block 404, the authentication control 126 can authenticate integrity of a reconfigurable entity map 212 associated with the memory system 116 of the embedded processing system 102 as part of entity map authentication 308. At block 406, the authentication control 126 can authenticate the configuration items 200, 312 based on the reconfigurable entity map 212. The embedded processing system 102 can perform an accommodation measure based on an authentication failure of at least one of the configuration items 200, 312. The accommodation measure can include one or more of: resetting the embedded processing system 102, switching the embedded processing system 102 to a fail-safe mode of operation, and/or transmitting an authentication failure message on a communication interface 124 to the communication system 132. The accommodation measure may be selected based on a level of criticality associated with the item being authenticated, where the level of criticality may be fixed or assigned based on one or more values of the reconfigurable entity map 212. For example, two or more different accommodation measures can be defined for a list of address ranges in the reconfigurable entity map 212. Failure accommodation for authentication failures may not be deferred after all entities are authenticated. Accommodation may happen immediately following a failure depending on the criticality of the function performed by the configuration item. For example, authentication failure of the immutable anchor can be immediate, but failure accommodation for a configuration item that does some diagnostic functionality may be simply to log a fault, and disable execution of the function.

In embodiments, one or more of the configuration items 200, 312, can be decrypted prior to authentication within the embedded processing system 102. For example, when one or more of the configuration items 200, 312 are provide from the loader system 134, data repository 136, and/or other source, the configuration items 200, 312 can be in an encrypted format and written temporarily into the volatile memory 118 for authentication prior to updating intended storage addresses within the non-volatile memory 120. The one or more of the configuration items 200, 312 can be signed and encrypted at a point of generation and encrypted and signed again for transfer to the loader system 134. The loader system 134 can decrypt the one or more of the configuration items 200, 312 and verify one or more associated signatures before transfer to the embedded processing system 102. Within the embedded processing system 102, the one or more of the configuration items 200, 312 can be decrypted and one or more associated signatures verified, for instance, during transfer into non-volatile memory 120 in the embedded processing system 102. The authentication control 126 may work in conjunction with the boot control 210 to manage the loading, authentication, and storage of the configuration items 200, 312 in the memory system 116. The boot control 210 can send a response indicating a success or failure of signature verification and/or authentication to the loader system 134. Upon successful authentication, a decrypted version of the one or more of the configuration items 200, 312 can be written to the non-volatile memory 120. As an alternative, one or more of the configuration items 200, 312 can be stored in the non-volatile memory 120 in an encrypted format and be decrypted and transferred to the volatile memory 118 upon authentication during a start-up process. If updates are made to the one or more of the configuration items 200, 312 in the volatile memory 118, periodic backup copies may be written to the non-volatile memory 120 (in an encrypted or decrypted format) to support recovery operations due to a loss of power or assertion of the reset signal 130.

While the above description has described the flow process of FIG. 4 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An embedded processing system of a controller of a gas turbine engine, the embedded processing system comprising:
   processing circuitry configured to execute a plurality of computer executable instructions;
   a memory system configured to store a plurality of configuration items, wherein at least one of the configuration items comprises an application configured to control operation of the gas turbine engine, and wherein at least one of the configuration items comprises a reconfigurable entity map that defines a list of address ranges of the configuration items; and
   an authentication control configured to:
      authenticate an immutable anchor associated with the embedded processing system, wherein authentication of the immutable anchor is performed upon receiving a reset signal at the embedded processing system, and the immutable anchor is encoded in read-only storage;
      authenticate integrity of the reconfigurable entity map upon successful authentication of the immutable anchor;
      locate one or more of the configuration items in the memory system based on the list of address ranges in the reconfigurable entity map upon successful authentication of the reconfigurable entity map;
      authenticate the one or more of the configuration items based on the reconfigurable entity map; and
      perform an accommodation measure based on an authentication failure of at least one of the configuration items.

2. The embedded processing system of claim 1, wherein the immutable anchor is hardware or software that establishes a root and chain of trust in authentication.

3. The embedded processing system of claim 1, wherein the reconfigurable entity map defines authentication requirements of the configuration items.

4. The embedded processing system of claim 3, wherein the list of address ranges comprises two or more address ranges for one of the configuration items.

5. The embedded processing system of claim 3, wherein two or more different accommodation measures are defined for the list of address ranges.

6. The embedded processing system of claim 3, wherein the reconfigurable entity map identifies at least one of the address ranges to skip authentication.

7. The embedded processing system of claim 1, wherein the accommodation measure comprises one or more of: resetting the embedded processing system, switching the embedded processing system to a fail-safe mode of operation, and transmitting an authentication failure message on a communication interface.

8. The embedded processing system of claim 1, wherein authentication comprises one or more asymmetric cryptographic methods using unique key pairs that result in an authentication failure in case of an incorrect key, a missing key, or software that is tampered with.

9. The embedded processing system of claim 1, wherein one or more of the configuration items are decrypted prior to authentication within the embedded processing system.

10. The embedded processing system of claim 1, wherein the read-only storage comprises a read-only memory or a read-only register.

11. A method comprising:
   authenticating, by an authentication control of an embedded processing system of a controller of a gas turbine engine, an immutable anchor associated with the embedded processing system, wherein the embedded processing system comprises a memory system configured to store a plurality of configuration items comprising a reconfigurable entity map that defines a list of address ranges of the configuration items, wherein at least one of the plurality of configuration items comprises an application configured to control operation of the gas turbine engine, and wherein authentication of the immutable anchor is performed upon receiving a reset signal at the embedded processing system, and the immutable anchor is encoded in read-only storage;
   authenticating, by the authentication control, integrity of the reconfigurable entity map upon successful authentication of the immutable anchor;
   locating, by the authentication control, one or more of the configuration items in the memory system based on accessing the list of address ranges in the reconfigurable entity map, wherein locating the one or more configuration items is performed upon successful authentication of the reconfigurable entity map;
   authenticating, by the authentication control, the one or more of the configuration items in the memory system based on the reconfigurable entity map; and
   performing an accommodation measure based on an authentication failure of at least one of the configuration items.

12. The method of claim 11, wherein the immutable anchor is hardware or software that establishes a root and chain of trust in authentication.

13. The method of claim 11, wherein the reconfigurable entity map defines authentication requirements of the configuration items.

14. The method of claim 13, wherein the list of address ranges comprises two or more address ranges for one of the configuration items.

15. The method of claim 13, wherein two or more different accommodation measures are defined for the list of address ranges.

16. The method of claim 13, wherein the reconfigurable entity map identifies at least one of the address ranges to skip authentication.

17. The method of claim 11, wherein the accommodation measure comprises one or more of: resetting the embedded processing system, switching the embedded processing system to a fail-safe mode of operation, and transmitting an authentication failure message on a communication interface.

18. The method of claim 11, wherein authentication comprises one or more asymmetric cryptographic methods using unique key pairs that result in an authentication failure in case of an incorrect key, a missing key, or software that is tampered with.

19. The method of claim 11, wherein one or more of the configuration items are decrypted prior to authentication within the embedded processing system.

20. The method of claim 11, wherein the read-only storage comprises a read-only memory or a read-only register.

* * * * *